(No Model.)
E. KRAUSE.
MEAT OR OTHER HOOK.
No. 532,972. Patented Jan. 22, 1895.
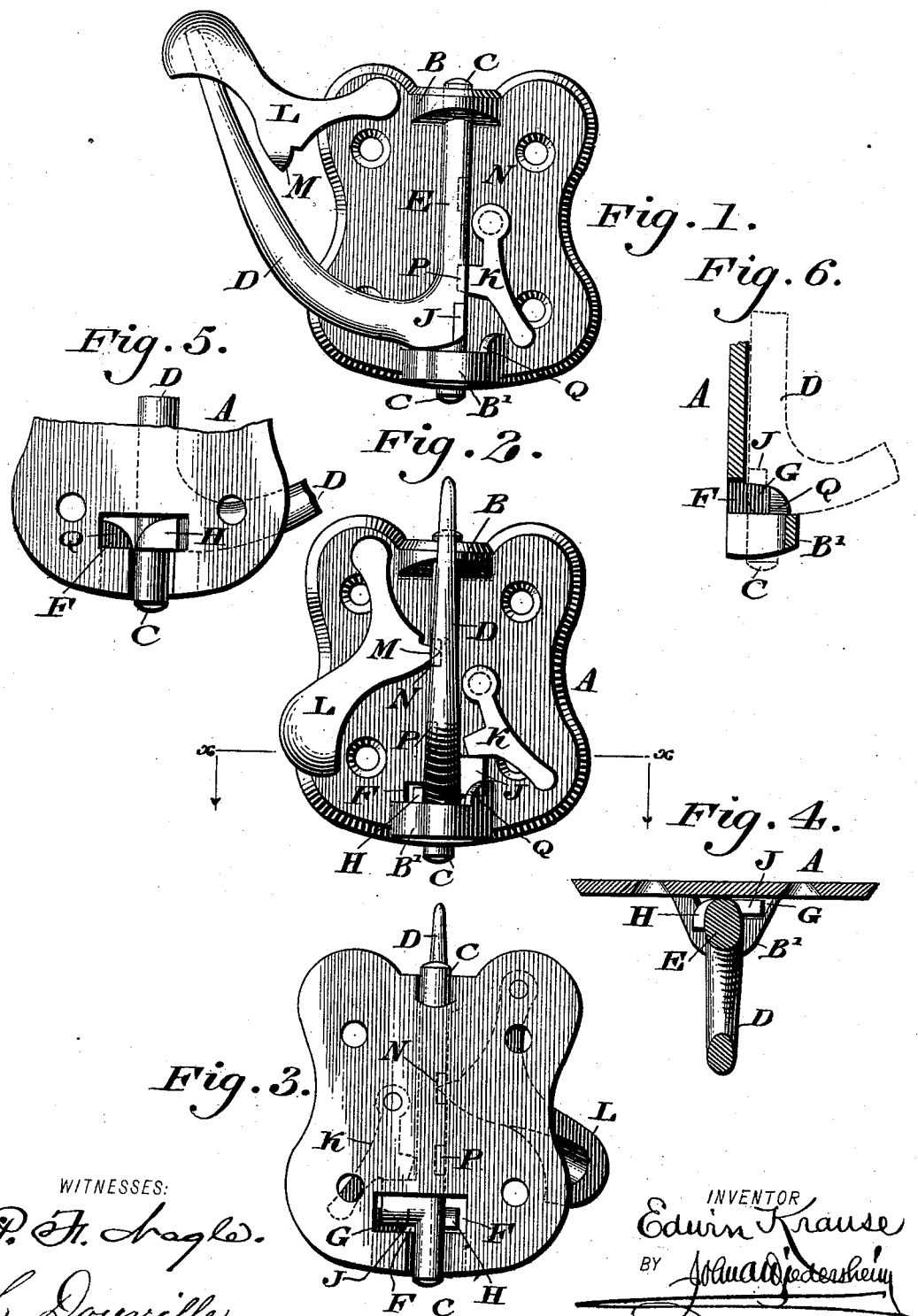
WITNESSES:
P. H. Nagle.
L. Douville.
INVENTOR
Edwin Krause
BY
Joshua Biedersheim
ATTORNEY.
THE NORRIS PETERS CO., PHOTO-LITHO., WASHINGTON, D. C.

UNITED STATES PATENT OFFICE.

EDWIN KRAUSE, OF PHILADELPHIA, PENNSYLVANIA.

MEAT OR OTHER HOOK.

SPECIFICATION forming part of Letters Patent No. 532,972, dated January 22, 1895.

Application filed April 12, 1894. Serial No. 507,206. (No model.)

*To all whom it may concern:*

Be it known that I, EDWIN KRAUSE, a citizen of the United States, residing in the city and county of Philadelphia, State of Pennsylvania, have invented a new and useful Improvement in Meat or other Hooks, which improvement is fully set forth in the following specification and accompanying drawings.

My invention consists of a meat or other hook which has a vertical axis, and is mounted on a back plate so as to be capable of swinging laterally thereon, when not in use, said hook being also provided with means for interlocking with said back plate and to be interlocked by a latching device thereon, so as to be prevented both from rising and swinging laterally, when in operative position, as will be hereinafter described and pointed out in the claims.

It also consists of a guard for the point of said hook, when the latter is in inoperative position, said guard being also adapted to lock the hook when the same is in operative position, as will be hereinafter set forth.

Figures 1 and 2 represent front views of a meat hook embodying my invention, the same being shown respectively in folded and operative positions. Fig. 3 represents a rear view thereof. Fig. 4 represents a horizontal section on line $x$, $x$, Fig. 2. Fig. 5 represents a rear view of the lower portion thereof, when the hook is in folded position. Fig. 6 represents a vertical section of the lower portion of the back plate and ear thereon, showing also a portion of the hook in dotted lines.

Similar letters of reference indicate corresponding parts in the several figures.

Referring to the drawings: A designates an attaching plate which is provided with horizontal ears B, B', in which are mounted the journals C of the hook D, said journals being respectively on the upper and lower ends of the back limb E of said hook, and extending in vertical direction therefrom.

In the plate A, above the lower ear B', is an opening F, and in the side of said ear, at or near its place of junction with the plate A, is a recess G.

On opposite sides of the lower end of the limb E are lugs H and J, which are so disposed that when the hook is in operative position, as shown in Fig. 2, said lug H rests freely on the ear B', and the lug J enters the recess G, by which latter provision the hook is prevented from returning.

Pivoted to the plate A, is a latch K, which is adapted to engage with the lug J, and thus prevent the rising of the hook, said plate having also pivoted to it the guard L which is so disposed that when the hook is in folded or inoperative position, said guard may be turned over the point of the hook and inclose the same, as shown in Fig. 1, whereby the hand is prevented from coming in contact with and being injured by said point, said guard having also on its inner side the nose M, which is adapted to enter a recess N in the limb E of the hook, as a latch, thus providing an additional lock for the hook and preventing the ascent of the same. A recess P is also formed in the limb E to receive the nose of the latch K, when the hook is folded, as in Fig. 1.

The operation is as follows: The hook is ready for use in Fig. 2, it being prevented from rotating or rising, as has been stated. When service of the hook is not required, the latch and guard are thrown back, and the hook is raised so that the lug J clears the recess G, after which the hook is turned laterally and lowered, the lug H then entering the opening F, and engaging with the top wall thereof, whereby the ascent of the hook is prevented. The guard L is now lowered, whereby it covers the point of the hook, as has been stated. The latch K is also lowered, and its nose enters the recess P, thus locking the limb E, and preventing vertical motion of the hook. When the latch is thrown back and the guard raised, the hook may be turned to the front, the lug J then rising on the elevation Q of the ear B', so as to lift the hook until said lug reaches the recess G, when the hook drops, and it is prevented from rotation by the action of said lug J, which entered said recess G. The latch and guard may then be lowered, whereby the hook is again locked, as previously described.

It will be observed that in order to prevent the ascent of the hook, it is not essential that both the latch and guard should engage with the limb E, but either or both may be used as described.

Having thus described my invention, what I claim as new, and desire to secure by Letters Patent, is—

1. A back plate having an opening F and an ear provided with a recess G, in combination with a rising and falling and rotating hook having lugs on the sides of its back limb, whereby said limb is locked against rotation respectively in its unfolded and folded positions, and a latch whereby the hook is prevented from rising when in said positions, substantially as described.

2. A plate having an ear, a raised portion on the upper wall of said ear, a vertical recess within said raised portion, and an opening adjacent to said ear in combination with a hook whose rear limb is journaled in said ear and provided with lugs on the sides of its rear limb adapted to enter said recess and opening respectively in the unfolded and folded positions of said hook, substantially as described.

3. A meat or similar pointed hook pivotally attached to a back plate, and having a guard adapted to cover the point thereof when the hook is folded back against the plate, substantially as described.

4. A meat or similar hook pivotally attached to a back plate, the latter having attached thereto a guard, which is adapted to both cover the point of the hook when the latter is in folded or inoperative position, and also to assist in locking said hook when in operative position, substantially as described.

5. A plate having an opening therein, and provided with an ear having a raised portion on its upper wall, and a recess at or near its junction with the said plate, a hook with a rear limb journaled in said ear, and lugs on the side of said limb adapted to enter said opening and recess, said parts being combined substantially as described.

6. A plate having ears and an opening, the latter being above the lower ear, the latter having a recess therein near its junction with said plate, a hook with its rear limb journaled in said ears, lugs on said rear limb, and a latch pivoted to said plate and having a projecting portion engaging in a recess in said rear limb of the hook, said parts being combined substantially as described.

7. A plate with ears thereon, a swinging hook with its rear limb journaled in said ears, and a guard for the point of said hook pivoted to said plate, and having a projection adapted to engage in a recess in the said rear limb of the hook, said parts being combined substantially as described.

8. A plate with ears, a hook with its rear limb journaled in said ears, a latch for locking said hook in operative position, and a guard for the point of said hook, said latch and guard moving substantially in the plane of the plate, said parts being combined substantially as described.

EDWIN KRAUSE.

Witnesses:
JOHN A. WIEDERSHEIM,
WM. C. WIEDERSHEIM.